(12) United States Patent
Schreder et al.

(10) Patent No.: US 9,665,089 B2
(45) Date of Patent: May 30, 2017

(54) METHOD AND APPARATUS FOR ADVANCED CONTROL USING FUNCTION BLOCKS IN INDUSTRIAL PROCESS CONTROL AND AUTOMATION SYSTEMS

(71) Applicant: Honeywell International Inc., Morristown, NJ (US)

(72) Inventors: James M. Schreder, Lansdale, PA (US); Muslim Gulam Kanji, Orefield, PA (US)

(73) Assignee: Honeywell International Inc., Morris Plain, NJ (US)

( * ) Notice: Subject to any disclaimer, the term of this patent is extended or adjusted under 35 U.S.C. 154(b) by 312 days.

(21) Appl. No.: 14/601,869

(22) Filed: Jan. 21, 2015

(65) Prior Publication Data

US 2016/0209834 A1 Jul. 21, 2016

(51) Int. Cl.
*G05B 19/42* (2006.01)
*G05B 13/02* (2006.01)
(Continued)

(52) U.S. Cl.
CPC ........... *G05B 19/41835* (2013.01); *G05B 2219/39266* (2013.01); *G06Q 10/06* (2013.01); *Y02P 90/02* (2015.11)

(58) Field of Classification Search
CPC .................................................. G06Q 10/06
(Continued)

(56) References Cited

U.S. PATENT DOCUMENTS

| | | | | | |
|---|---|---|---|---|---|
| 4,481,567 A | * | 11/1984 | Kaya | ............... | G05B 13/044 |
| | | | | | 700/37 |
| 5,384,698 A | * | 1/1995 | Jelinek | ............... | G05B 5/01 |
| | | | | | 700/29 |

(Continued)

FOREIGN PATENT DOCUMENTS

| JP | 2006065598 A | 3/2006 |
|---|---|---|
| JP | 2012230701 A | 11/2012 |

OTHER PUBLICATIONS

Morari, Adaptive Model Predictive Control of Constrained Multiple-Input Multiple-Output Systems and Its Application to the Quad Tank System, Jun. 2, 2014, Automatic Control Laboratory, pp. 78.*

(Continued)

*Primary Examiner* — Suresh Suryawanshi (57) ABSTRACT

A method includes executing a first function block configured to (i) receive multiple input data values associated with an industrial process control and automation system, (ii) pre-process the input data values, and (iii) store the pre-processed input data values in a shared memory. The method also includes executing a second function block configured to (i) receive references to the pre-processed input data values in the shared memory, (ii) invoke execution of one or more core functions to implement a process control algorithm, and (iii) store output data values in the shared memory. The method further includes executing a third function block configured to (i) receive references to the output data values in the shared memory, (ii) post-process the output data values, and (iii) output multiple output signals containing the post-processed output data values.

20 Claims, 6 Drawing Sheets

(51) Int. Cl.
*G05B 19/418* (2006.01)
*G06Q 10/06* (2012.01)

(58) Field of Classification Search
USPC .......................................................... 700/89
See application file for complete search history.

(56) References Cited

U.S. PATENT DOCUMENTS

| | | | | | |
|---|---|---|---|---|---|
| 5,740,033 | A | * | 4/1998 | Wassick | G05B 13/048 700/29 |
| 5,920,478 | A | * | 7/1999 | Ekblad | G05B 11/32 318/139 |
| 6,445,963 | B1 | * | 9/2002 | Blevins | G05B 11/32 700/19 |
| 7,209,846 | B2 | | 4/2007 | Tamaki et al. | |
| 7,330,767 | B2 | * | 2/2008 | Thiele | G05B 11/32 345/156 |
| 7,451,004 | B2 | | 11/2008 | Thiele et al. | |
| 7,515,972 | B2 | | 4/2009 | Kumar et al. | |
| 7,729,789 | B2 | * | 6/2010 | Blevins | G05B 17/02 345/418 |
| 8,055,358 | B2 | * | 11/2011 | Blevins | G05B 13/022 700/28 |
| 8,504,175 | B2 | * | 8/2013 | Pekar | G05B 13/048 700/12 |
| 8,532,797 | B2 | | 9/2013 | Gutha et al. | |
| 2004/0213285 | A1 | | 10/2004 | Stevenson et al. | |
| 2008/0189441 | A1 | | 8/2008 | Jundt et al. | |
| 2011/0040390 | A1 | | 2/2011 | Blevins et al. | |
| 2014/0121812 | A1 | | 5/2014 | Rudnick et al. | |

OTHER PUBLICATIONS

Asar, Model Predictive Control (MPC) Performance for Controlling Reaction Systems, Jun. 2004, Middle East Technical University, pp. 167.*

Morari et al, "Model predictive control: past, present and future", Feb. 11, 1998, pp. 16.*

Megan et al, MPC Performance Monitoring and Disturbance Model Identification, 2014, University of Wisconsin-Madison, pp. 196.*

Notification of Transmittal of the International Search Report and the Written Opinion of the International Searching Authority, or the Declaration dated Jun. 23, 2016 in connection with International Patent Application No. PCT/US2016/013187.

* cited by examiner

METHOD AND APPARATUS FOR ADVANCED CONTROL USING FUNCTION BLOCKS IN INDUSTRIAL PROCESS CONTROL AND AUTOMATION SYSTEMS

TECHNICAL FIELD

This disclosure relates generally to industrial process control and automation systems. More specifically, this disclosure relates to a method and apparatus for advanced control using function blocks in industrial process control and automation systems.

BACKGROUND

Industrial process control and automation systems are often used to automate large and complex industrial processes. Many control and automation systems include multiple layers of controllers that perform different functions. For example, lower layers could include controllers that receive measurements from sensors and generate control signals for actuators, and higher layers could include controllers that provide plantwide optimization solutions or other higher-level functions. Functionality in lower-level controllers is often implemented using function blocks. Function blocks represent discrete sections of code that can be executed by a controller. Groups of function blocks can be defined, connected, and executed in various ways to provide desired functionality within a controller.

SUMMARY

This disclosure provides a method and apparatus for advanced control using function blocks in industrial process control and automation systems.

In a first embodiment, a method includes executing a first function block configured to (i) receive multiple input data values associated with an industrial process control and automation system, (ii) pre-process the input data values, and (iii) store the pre-processed input data values in a shared memory. The method also includes executing a second function block configured to (i) receive references to the pre-processed input data values in the shared memory, (ii) invoke execution of one or more core functions to implement a process control algorithm, and (iii) store output data values in the shared memory. The method further includes executing a third function block configured to (i) receive references to the output data values in the shared memory, (ii) post-process the output data values, and (iii) output multiple output signals containing the post-processed output data values.

In a second embodiment, an apparatus includes at least one memory device having a shared memory. The apparatus also includes at least one processing device configured, during execution of a first function block, to (i) receive multiple input data values associated with an industrial process control and automation system, (ii) pre-process the input data values, and (iii) store the pre-processed input data values in the shared memory. The at least one processing device is also configured, during execution of a second function block, to (i) receive references to the pre-processed input data values in the shared memory, (ii) invoke execution of one or more core functions to implement a process control algorithm, and (iii) store output data values in the shared memory. The at least one processing device is further configured, during execution of a third function block, to (i) receive references to the output data values in the shared memory, (ii) post-process the output data values, and (iii) outputting multiple output signals containing the post-processed output data values.

In a third embodiment, a non-transitory computer readable medium embodies at least one computer program. The at least one computer program includes computer readable program code that defines a first function block configured to (i) receive multiple input data values associated with an industrial process control and automation system, (ii) pre-process the input data values, and (iii) store the pre-processed input data values in a shared memory. The at least one computer program also includes computer readable program code that defines a second function block configured to (i) receive references to the pre-processed input data values in the shared memory, (ii) invoke execution of one or more core functions to implement a process control algorithm, and (iii) store output data values in the shared memory. The at least one computer program further includes computer readable program code that defines a third function block configured to (i) receive references to the output data values in the shared memory, (ii) post-process the output data values, and (iii) output multiple output signals containing the post-processed output data values.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 10, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
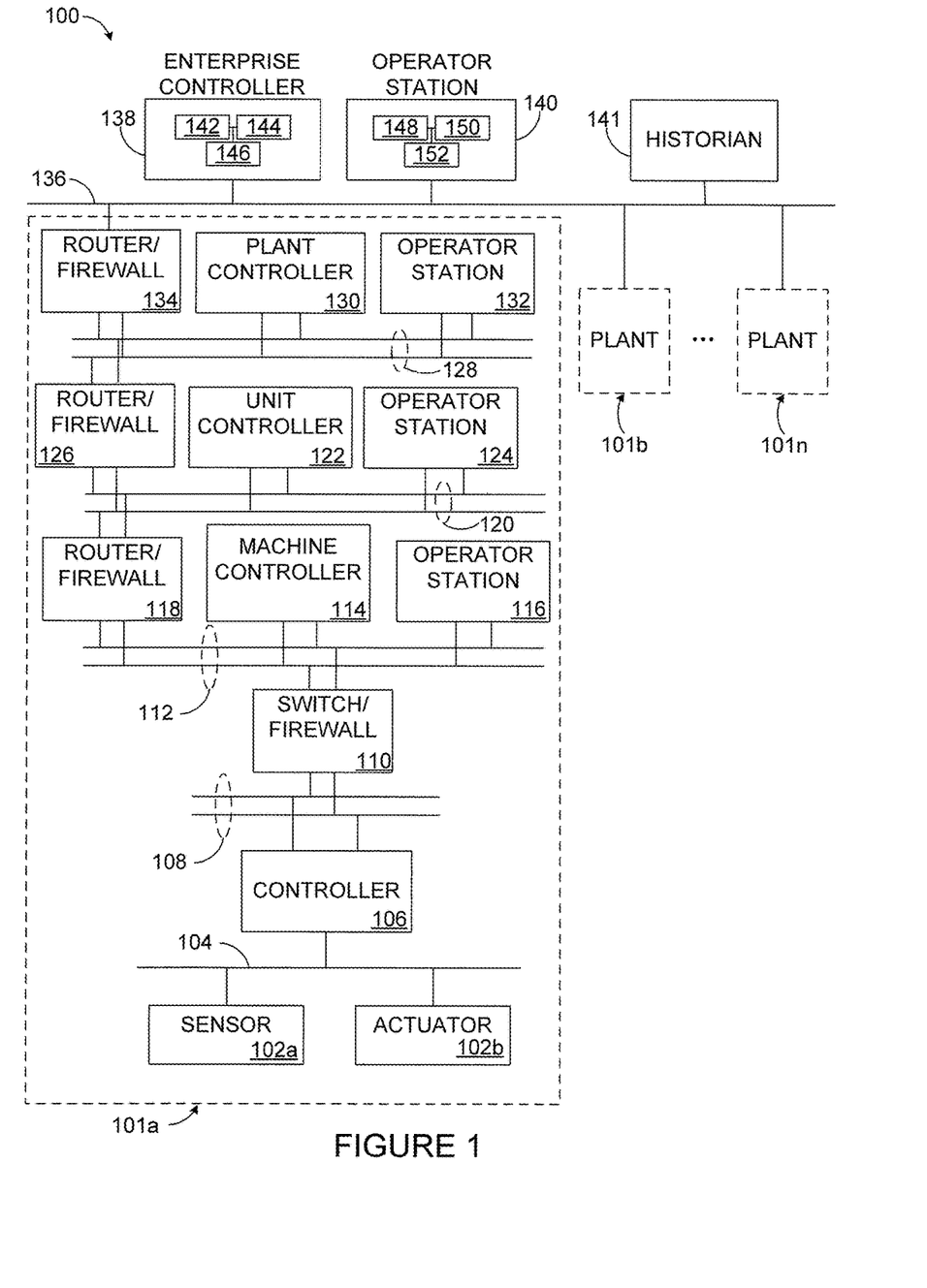
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101*a*-101*n*. Each plant 101*a*-101*n* represents one or more processing facilities (or one or more portions thereof), such as one or more manufacturing facilities for producing at least one product or other material. In general, each plant 101*a*-101*n* may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Multiple controllers 106 could also operate in redundant configurations, such as when one controller 106 operates as a primary controller while another controller 106 operates as a backup controller (which synchronizes with the primary controller and can take over for the primary controller in the event of a fault with the primary controller). Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102*a*, and actuators 102*b*).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101*a*-101*n*, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101*a*-101*n* and to control various aspects of the plants 101*a*-101*n*. The enterprise-level controllers 138 can also perform various functions to support the operation and control of components in the plants 101*a*-101*n*. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101*a* is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

As described above, function blocks representing discrete sections of code can be executed by a controller. Groups of function blocks can be defined, connected, and executed in various ways to provide desired functionality within a controller. Advanced control algorithms, such as multiple input-multiple output (MIMO) model predictive control (MPC), provide more optimal process control than standard regulatory control algorithms like Proportional-Integral-Derivative (PID) control blocks. Supporting MIMO MPC or other advanced control algorithms in redundant process-connected Level 1 controllers can greatly improve the availability and robustness of the control algorithms compared to situations where the same control algorithms execute in a Level 2 or Level 3 control environment.

This disclosure provides an efficient implementation of a MIMO MPC algorithm or other advanced MIMO control algorithm, which is suitable for hosting in a redundant process-connected controller. The control algorithm is divided into three distinct function blocks, namely:

an input function block that collects multiple inputs;

an algorithm function block that executes or initiates execution of an MPC or other advanced control algorithm; and an output function block that posts multiple output values and manages control cascade output connections.

Data can be shared between the function blocks using at least one shared memory space. The input and output function blocks can execute at regular intervals in a foreground processing task (also called a "budgeted task"). The algorithm function block can also execute in the foreground processing task but can initiate various functions that are executed in a background processing task. In some embodiments, the foreground processing task can denote a task that needs to complete execution within a single processing cycle with strict timing requirements and is often less processor-intensive. In contrast, the background processing task can denote a task that may require multiple processing cycles to complete and is often more processor-intensive.

Among other things, this approach divides the responsibilities or functions associated with MPC control logic or other control logic across three function blocks. Depending on the circumstances, changes can be made to one function block without requiring changes to the other function blocks. For example, this approach provides extensibility to support alternative advanced control algorithms in the algorithm function block without requiring changes in the input and output function blocks. Moreover, the execution of the algorithm function block in the foreground task while invoking functions in the background task allows intensive calculations to be performed in the background task in between regularly-scheduled execution in the foreground task. This allows various functions to be executed that might not otherwise be permitted under the strict constraints placed on the foreground tasks. Additional details regarding the use of multiple function blocks to implement MPC or other advanced control functionality are provided below.

Note that in some embodiments discussed below, this approach is described as being used in a control execution environment (CEE). An execution environment typically denotes an environment, created by one or more programs, that supports basic features used by other programs executed in the environment. A control execution environment denotes an environment in which process control algorithms (including those implemented using function blocks) can be executed to control an industrial process. The control execution environment can also enforce timing and other requirements placed on foreground and background tasks, control scheduling of the foreground and background tasks, and control memory usage by the foreground and background tasks. One example control execution environment is described in U.S. Pat. No. 8,245,239, which is hereby incorporated by reference in its entirety.

Although FIG. 1 illustrates one example of an industrial process control and automation system 100, various changes may be made to FIG. 1. For example, a control system could include any number of sensors, actuators, controllers, servers, operator stations, and networks. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, while FIG. 1 illustrates one example environment in which MPC or other advanced control functionality can be implemented using function blocks, this functionality can be used in any other suitable device or system.

Figure 2:
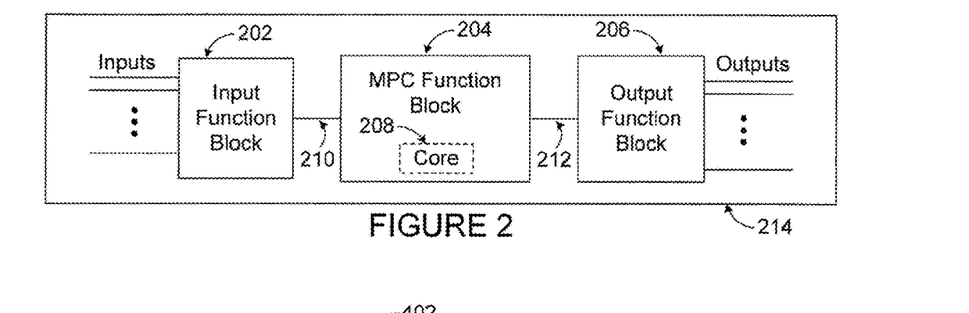
FIG. 2 illustrates an example function block implementation of advanced control functionality in a controller according to this disclosure.

FIG. 2 illustrates an example function block implementation of advanced control functionality in a controller according to this disclosure. The function block implementation could, for example, be implemented in the controllers 106 of FIG. 1, although this functionality could be implemented in any other suitable device and in any other suitable system.

In the discussion below, the following acronyms are used:

CEEB—a CEE budgeted task that controls execution of functions within the foreground of a CEE;

CEEM—a CEE background task that controls execution of functions within the background of a CEE; and CEEU—a CEE un-budgeted task that occurs whenever time and computing resources permit.

In some embodiments, among these three types of tasks, the CEEB task could have the highest priority, the CEEM task could have a lower priority, and the CEEU task could have the lowest priority.

The following types of process variables are also discussed below:

CV—a Controlled Variable denoting a variable whose value is controlled to be at or near a setpoint or within a desired range;

MV—a Manipulated Variable denoting a variable that is adjusted in order to alter the value of at least one CV; and DV—a Disturbance Variable denoting a variable whose value can be considered but not controlled or adjusted.

As an example, a controlled variable may denote a flow rate of material, a manipulated variable may denote a position of a valve that alters the flow rate, and a disturbance variable may denote ambient temperature that affects the flow rate but that cannot be altered or controlled.

As shown in FIG. 2, advanced control functionality in a controller is implemented using three function blocks 202-206. The function block 202 denotes an input function block that is responsible for receiving multiple input values, such as multiple CV and/or DV input values, and pre-processing the input values. The input function block 202 is executed within the foreground of an execution environment, like as part of the CEEB task. Among other things, the input function block 202 could read various input values and save the values in a shared memory for downstream block access. Example pre-processing could include range checking (determining if an input value is within a specified range), rate of change checking (determining if an input value is changing above or below a specified rate), and freeze checking (determining if an input value has not changed for a specified length of time). The pre-processing could also include examining an MV to verify that changes to the MV are implemented or to perform limit ramping (determining if a value of an MV is moving at least at a specified rate towards a violated limit). Any other or additional pre-processing could be performed by the input function block 202.

The function block 204 denotes an algorithm function block that is used to execute or initiate execution of an MPC or other advanced control algorithm. The control algorithm could perform any desired advanced control function, such as using the input values and a model of an industrial process to generate control signals for adjusting the industrial process. Model predictive control is a well-known control technique that uses a model to predict how one or more CVs in an industrial process will act in the future in response to changes to one or more MVs and/or one or more DVs. The model is often generated using step-testing, historical data, or other approaches. The input function block 202 can pass references to the input values in the shared memory to the algorithm function block 204, allowing the algorithm function block 204 to access and use those input values. As noted above, the actual MPC or other control algorithm can be executed partially within a foreground task (like as part of the CEEB task) and partially within a background task (like as part of the CEEM task). A core 208 here denotes the portion of the control algorithm that is executed within the background task. The function block 204 may sometimes be referred to as a "faceplate function block" for a control algorithm since the function block 204 is executed in a foreground task and is used to invoke functions of the core 208 in a background task.

The function block 206 denotes an output function block that is responsible for obtaining multiple output values, such as multiple MV values, and post-processing the multiple output values. The output function block 206 provides the post-processed output values as multiple output signals. The output function block 206 is executed within the foreground of an execution environment, like as part of the CEEB task. Among other things, the output function block 206 could obtain various output values that are generated by the algorithm function block 204 and that are stored by the algorithm function block 204 in the shared memory. The algorithm function block 204 can pass references to the output values in the shared memory to the output function block 206, allowing the output function block 206 to access and use those output values. Example post-processing could include resolution handling (ensuring that MV values have an appropriate resolution for actuators) and handling control shredding and control start-up issues. Any other or additional post-processing could be performed by the output function block 206.

Data connections 210-212 in FIG. 2 denote logical data flows between the function blocks 202-206. As noted above and described in greater detail below, the function blocks 202-206 can use a shared memory to exchange data, so references to data values in the shared memory can be passed along the data connections 210-212 between the function blocks. The data connection 212 also supports control cascade behaviors because the output function block 206 can be located in the control cascade chain of a secondary Regulatory Control (RegCtl) function block. For example, the input function block 202 could receive data from analog input (AI) channel process variables (PVs) or from data acquisition (DataAcq) PVs primarily, and the output function block 206 could provide data to a RegCtl setpoint (SP) or output (OP) value (during direct control).

In some embodiments, a collection of at least two of the function blocks 202-206 resides within a larger logical structure referred to as a component block 214. A controller (such as a controller 106) could include a single component block 214 or multiple component blocks 214, depending on the implementation. In particular embodiments, each component block 214 can include a number of configuration parameters defining characteristics of the component block 214. The configuration parameters could include a parameter named OrderInCM, which dictates the execution sequence of the function blocks in the component block 214. The expected execution sequence would typically be the input function block 202, the algorithm function block 204, and the output function block 206. Another configuration parameter could define the number of CVs, DVs, and MVs associated with a component block 214, and this value can help to define the size of the shared memory to be used by the component block 214. Once a particular memory space is assigned as a shared memory to a component block 214, a reference to the shared memory space can be made available to all function blocks 202-206 in the component block 214, such as during loading of the function blocks.

Although FIG. 2 illustrates one example of a function block implementation of advanced control functionality in a controller, various changes may be made to FIG. 2. For example, this approach is not limited to use with MPC and could be used with any suitable advanced process control functionality. Also, there need not be a one-to-one association between two functions blocks or between a function block and a core.

Figure 3:
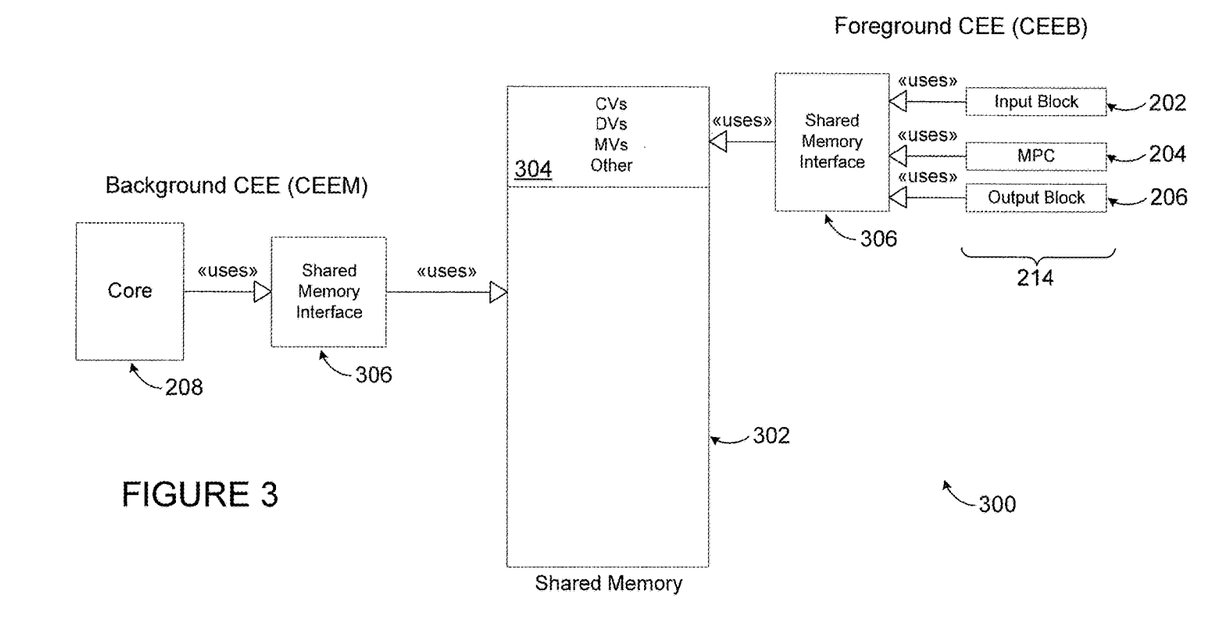
FIG. 3 illustrates an example data model used by advanced control function blocks according to this disclosure.

FIG. 3 illustrates an example data model 300 used by advanced control function blocks according to this disclosure. The data model 300 could, for example, be used to support interactions and data transfers between the function blocks 202-206 in a process controller 106. However, any other suitable data model could be used by the function blocks 202-206, and the data model 300 could be used in any other suitable device or system.

As shown in FIG. 3, the data model 300 includes a shared memory 302, which is used to support transfers of CV, MV, and DV data values or other control-related or state-related data between the function blocks 202-206 and the core 208. Thus, the shared memory 302 supports both (i) the transfer of data between function blocks and (ii) the transfer of data between foreground and background tasks. In this example, the shared memory 302 includes a memory space 304 that supports data transfers between the function blocks 202-206 associated with a single component block 214 and a single core 208. Multiple memory spaces 304 could also exist in the shared memory 302, such as memory spaces 304 for different component blocks 214 (which may or may not invoke the same core 208). The shared memory 302 includes any suitable storage and retrieval device(s).

The shared memory 302 is accessed via a shared memory interface 306. Although multiple instances of the shared memory interface 306 are shown in FIG. 3, this is for ease of illustration only, and a single shared memory interface 306 could be supported to access the shared memory 302. The shared memory interface 306 is used by the function blocks 202-206 and core 208 to access the shared memory 302. The shared memory interface 306 could perform various functions to support access to a shared memory, such as by performing integrity checks to validate data access and to validate the components attempting the data access.

The use of a shared memory can be beneficial since it helps to reduce or minimize duplications of shared data between components. Various functions can also be performed to help ensure proper use of the shared memory. For example, one or more semaphores can be used to help ensure that only one component accesses a particular memory location at a given time. Also, mutual exclusion between tasks can be guaranteed with a specified priority scheme and by having the CEEM task remain dormant until triggered by the CEEB task. For example, individual writes into the shared memory 302 by the CEEM task can be protected by raising the priority of the CEEM task to match the priority of the CEEB task (which normally has a higher priority than the CEEM task). This can help to ensure that there are no partial writes by the CEEM task. Note that the granularity for the raised priority can be over a parameter write.

Although FIG. 3 illustrates one example of a data model 300 used by advanced control function blocks 202-206, various changes may be made to FIG. 3. For example, while a single component block 214 and a single core 208 are shown here, the same shared memory 302 could be used by multiple component blocks or cores.

Figure 4:
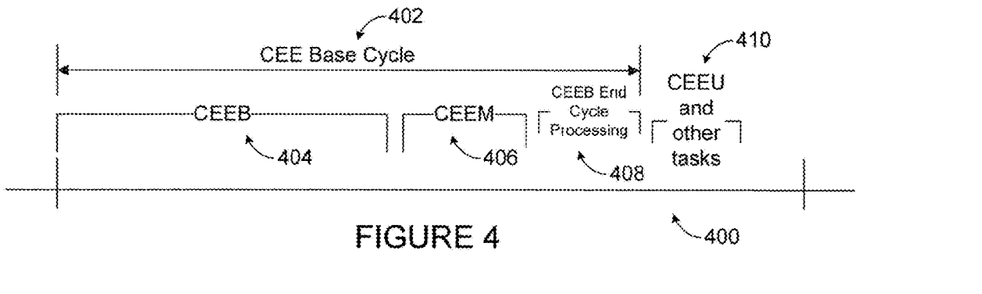
FIGS. 4 through 9 illustrate example uses of foreground and background tasks to execute advanced control functionality according to this disclosure.

FIGS. 4 through 9 illustrate example uses of foreground and background tasks to execute advanced control functionality according to this disclosure. As shown in FIG. 4, a single execution cycle 400 within a CEE is illustrated. The execution cycle 400 includes a base cycle 402 having up to three time periods 404-408. The first time period 404 is used to execute the CEEB task, and the second time period 406 is used to execute the CEEM task. The third time period 408 can be used for CEEB end cycle processing, which could support functions such as CEEB overrun detection, the updating of CEE base cycle statistics, and the triggering of periodic execution of communication protocols. After the base cycle 402, a time period 410 could optionally be provided for unbudgeted CEEU tasks or other tasks.

In some embodiments, the CEEB task can represent an operating system (OS) timed event for the start of a new base cycle. The CEEB task executes the function blocks 202-206, along with various other functions. The CEEB task can also trigger execution of the CEEM task so that the CEEM task remains dormant until signaled by the CEEB task. The CEEM task executes the core 208 and other functions as long as there is adequate time in the execution cycle 400. The CEEB task could have the highest priority in FIG. 4, while the CEEM task could have a lower priority except during its execution when its priority is raised. The unbudgeted CEEU and other tasks could have the lowest priority in FIG. 4 and may be executed as long as there is adequate time in the execution cycle 400.

Figure 5:
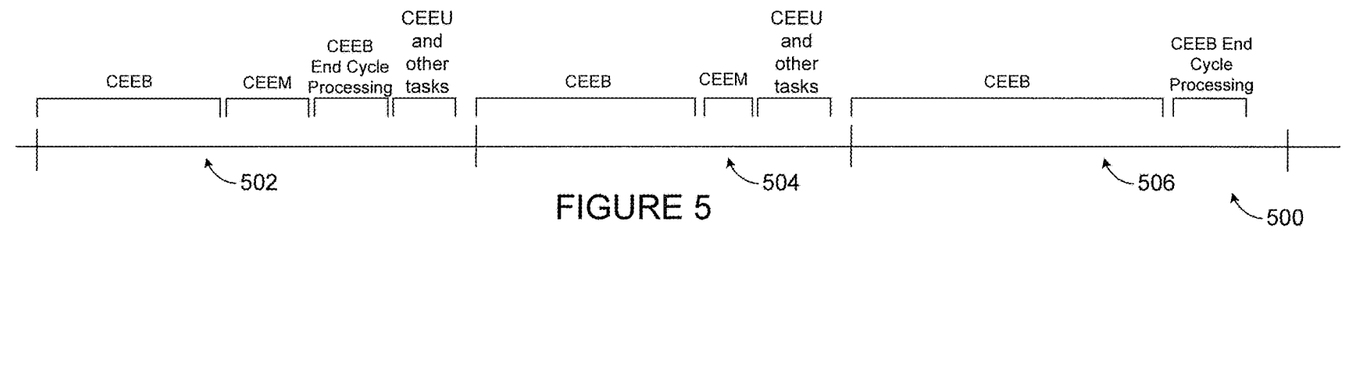

FIG. 5 illustrates an example series 500 of execution cycles 502-506, which can be executed within a CEE. As noted above, the CEEM task may or may not be executed within the base cycle 402 of an execution cycle, and the CEEU or other task may or may not be executed within an execution cycle. The decision whether to execute the CEEM/CEEU tasks could be based on one or more factors, such as the current processing load within the CEE. In FIG. 5, for example, the CEEM and CEEU tasks are omitted from the execution cycle 506. Also, CEEB end cycle processing may not be needed in all execution cycles and is omitted from the execution cycle 504. In addition, the length of time dedicated to CEEB execution can be variable from execution cycle to execution cycle. This shows that the CEE can support a variety of different types of executions in the execution cycles.

In particular embodiments, CEEM processing time can vary across base cycles and can depend on processing cycle usage of the base cycles. For example, the CEEM task may receive no processing time if a base cycle already has a processing load above a threshold (such as at least 70% of the base cycle). One instance of this is shown in the execution cycle 506, where the CEEM task is not executed because other tasks consume at least the threshold amount of processing time/resources. If the base cycle only has a processing load of 10% for other tasks, the CEEM task can be afforded 60% of the processing time in the base cycle. The CEEM task can also exit early if processing is finished before expiration of its allotted time. If the CEEM task is executed, it could be provided at least a minimum time for execution, such as 2 ms. One example of this is shown in the execution cycle 504, where the CEEM task is given only 2 ms to execute.

FIGS. 6 through 9 illustrate signaling diagrams used to control execution of CEEB and CEEM tasks. In the following discussion, two semaphores help to ensure proper usage of the shared memory 302: SemCeemCycleStart and SemCeemCycleEnd. The CEEB task owns the SemCeemCycleStart semaphore, and the CEEM task owns the SemCeemCycleEnd semaphore. In these signaling diagrams, the "operating system" denotes the operating system of the device executing the CEEB, CEEM, CEEU, and other tasks.

Figure 6:
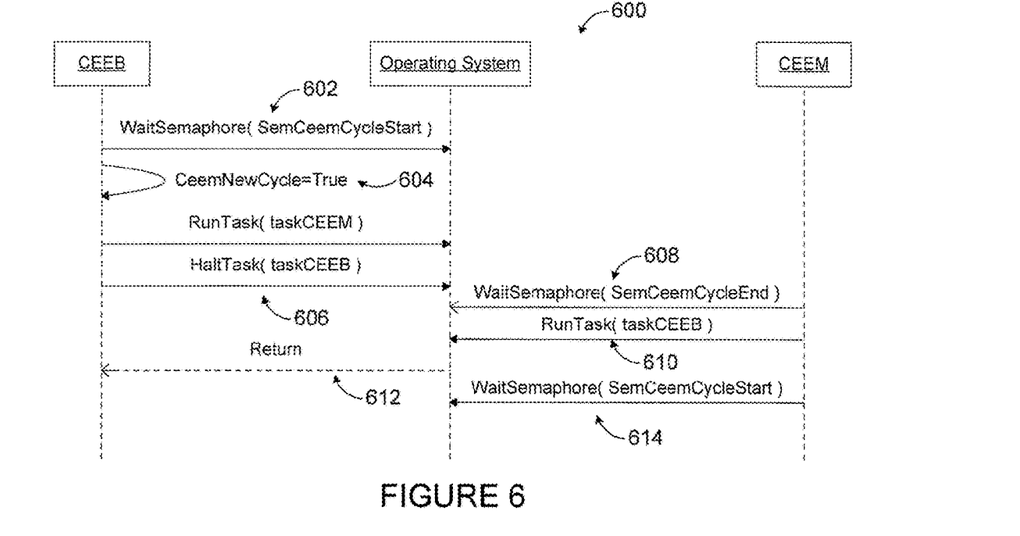

FIG. 6 illustrates an example signaling diagram 600 that could be used during startup of a controller. As shown in FIG. 6, the CEEB task issues a wait semaphore command for the SemCeemCycleStart semaphore at step 602 and sets a "new cycle" flag to true in order to indicate the start of a new CEEM cycle at step 604. Two calls in step 606 are used to inform the integrity unit that execution of the CEEM task is starting and execution of the CEEB task is halting. The CEEM task issues a wait semaphore command for the SemCeemCycleEnd semaphore at step 608 and indicates that execution of the CEEB task is resuming at step 610. Control returns to the CEEB task at step 612, and the CEEM task issues another wait semaphore command for the SemCeemCycleEnd semaphore at step 614. This process helps to initialize expected ownerships of the binary semaphores between the CEEB and CEEM tasks.

Figure 7:
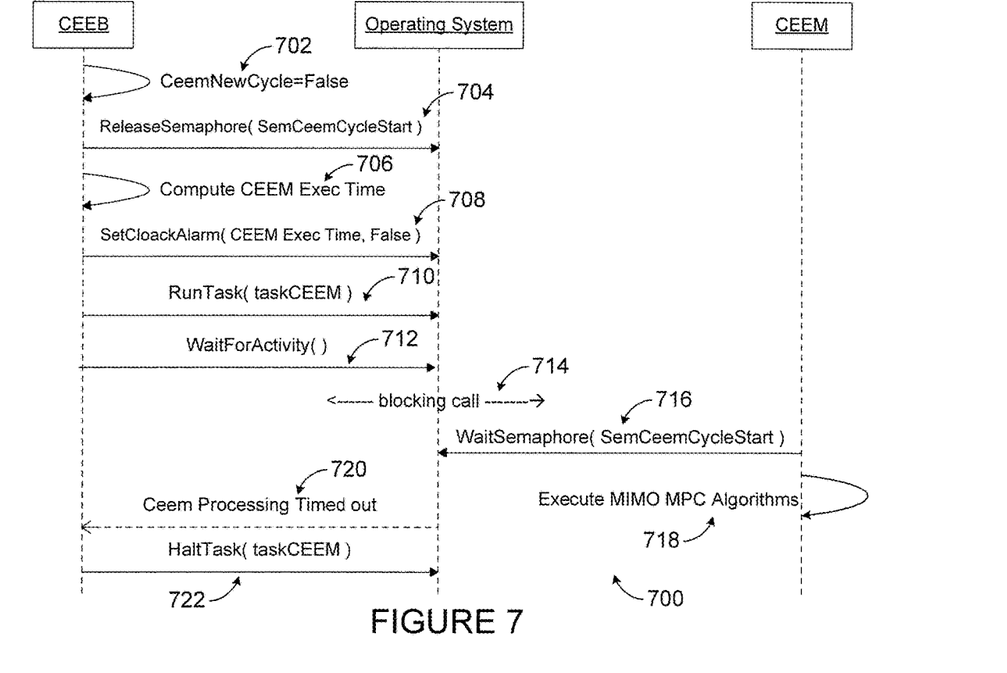

FIG. 7 illustrates an example signaling diagram 700 that could be used to initiate execution of the CEEM task during light loads when the CEEB processing time expires. As shown in FIG. 7, the CEEB task sets the "new cycle" flag to false at step 702 and issues a release semaphore command for the SemCeemCycleStart semaphore at step 704. The CEEB task computes an amount of permissible execution time for the CEEM task at step 706 (which could be based on the length of the base cycle 402 and the execution time of the CEEB task), and a high-resolution clock is initialized with this time at step 708. A call in step 710 is used to inform the integrity unit that execution of the CEEM task is starting, and the CEEB task waits for an activity indicator from the integrity unit at step 712. After a blocking call at step 714, the CEEM issues a wait semaphore command for the SemCeemCycleEnd semaphore at step 716, and one more MIMO MPC or other control algorithms are executed as part of the CEEM task at step 718. Once the clock times out at step 720, the CEEB task halts execution of the CEEM task at step 722.

Figure 8:
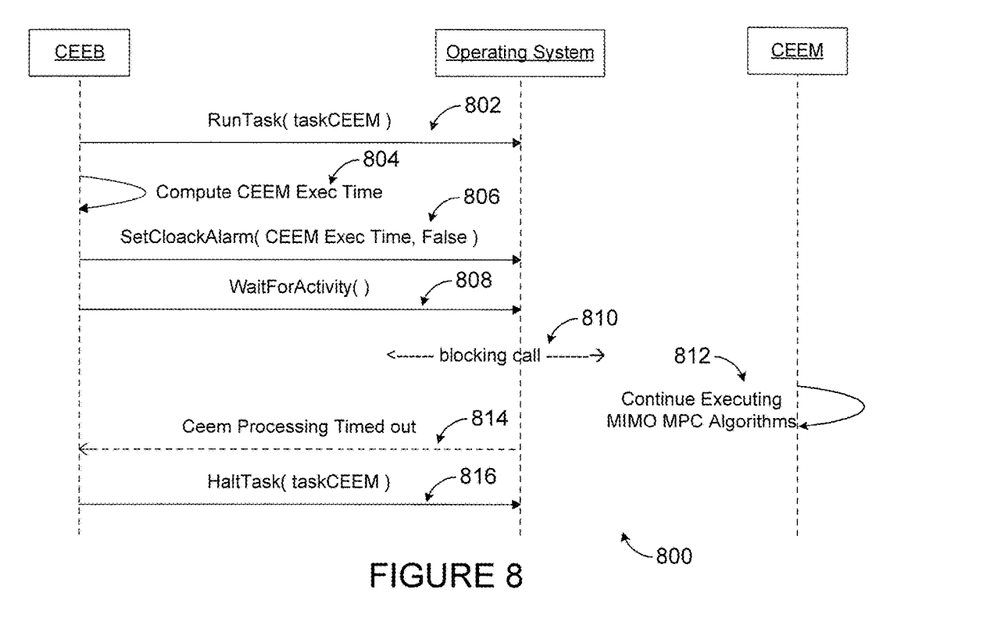

FIG. 8 illustrates an example signaling diagram 800 that could be used to continue execution of the CEEM task during light loads when the CEEB processing time expires. As shown in FIG. 8, a call in step 802 is used to inform the integrity unit that execution of the CEEM task is starting. The CEEB task computes an amount of permissible execution time for the CEEM task at step 804, and the high-resolution clock is initialized with this time at step 806. The CEEB task waits for an activity indicator from the integrity unit at step 808. After a blocking call 810, the CEEM task continues execution of the one more MIMO MPC or other control algorithms as part of the CEEM task at step 812. Once the clock times out at step 814, the CEEB task halts execution of the CEEM task at step 816.

Figure 9:
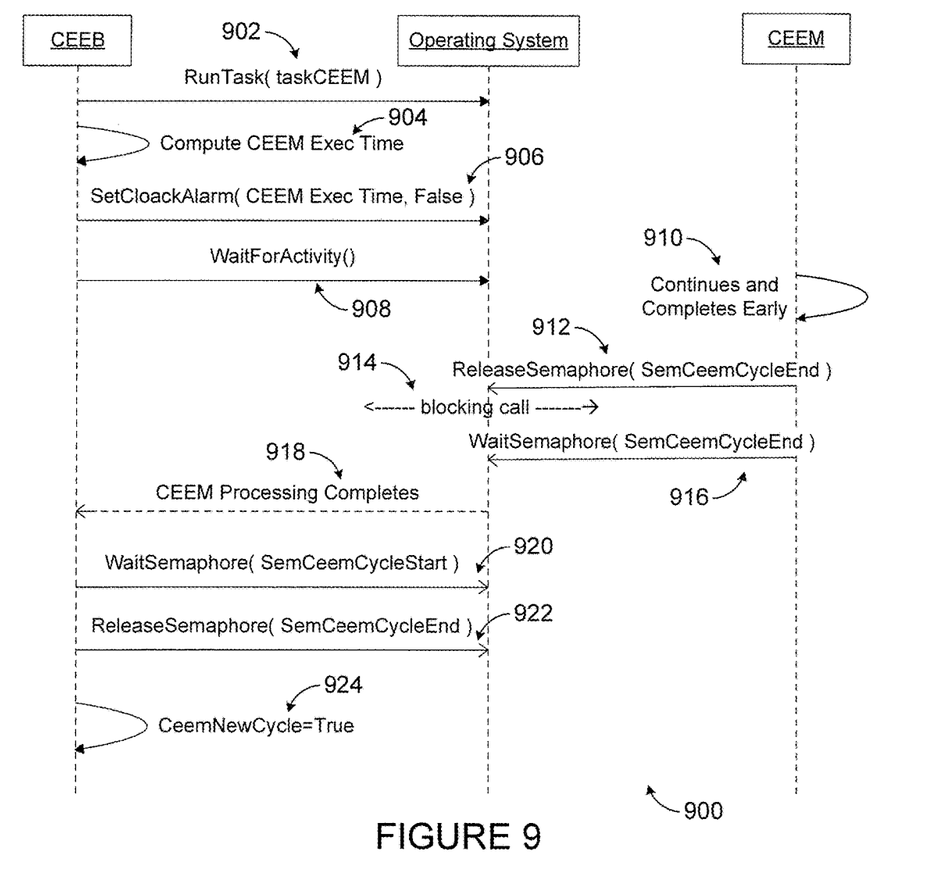

FIG. 9 illustrates an example signaling diagram 900 that could be used to continue and complete execution of the CEEM task during light loads when the CEEB processing time expires. In this example, the CEEM task completes execution before the allotted time expires, although this need not be the case. As shown in FIG. 9, a call in step 902 is used to inform the integrity unit that execution of the CEEM task is resuming. The CEEB task computes an amount of permissible execution time for the CEEM task at step 904, and the high-resolution clock is initialized with this time at step 906. The CEEB task waits for an activity indicator from the integrity unit at step 908. The CEEM task continues and completes execution of the one more MIMO MPC or other control algorithms as part of the CEEM task at step 910. The CEEM task issues a release semaphore command for the SemCeemCycleEnd semaphore at step 912. After a blocking call 914, the CEEM task issues a wait semaphore command for the SemCeemCycleEnd semaphore at step 916, and the integrity unit indicates to the CEEB task that CEEM processing is completed at step 918. The CEEB task issues a wait semaphore command for the SemCeemCycleStart semaphore at step 920, issues a wait semaphore command for the SemCeemCycleEnd semaphore at step 922, and sets the "new cycle" flag to indicate the start of the next CEEM cycle at step 924.

Although FIGS. 4 through 9 illustrate example uses of foreground and background tasks to execute advanced control functionality, various changes may be made to FIGS. 4 through 9. For example, execution of various tasks could occur in any other suitable manner. Also, any other suitable signaling could be used to invoke and control execution of the CEEB and CEEM tasks.

Figure 10:
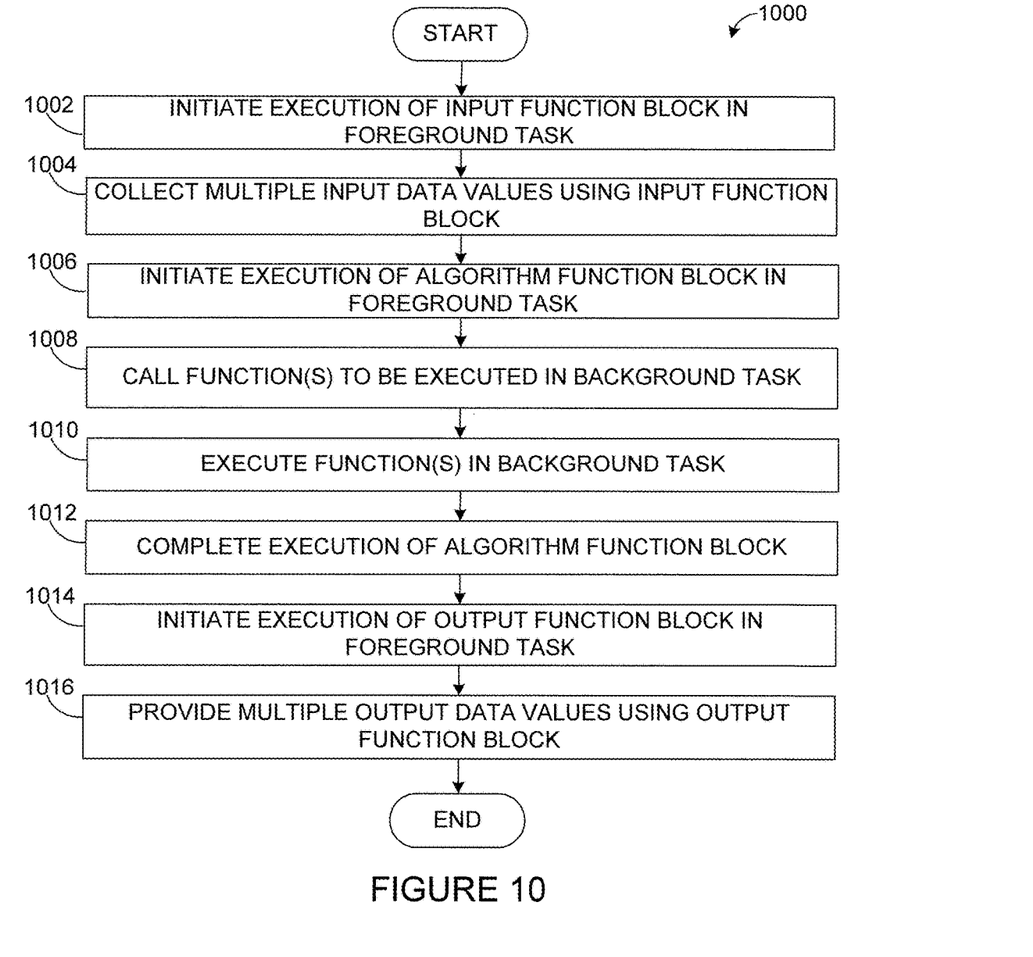
FIG. 10 illustrates an example method for advanced control in an industrial process control and automation system according to this disclosure.

FIG. 10 illustrates an example method 1000 for advanced control in an industrial process control and automation system according to this disclosure. For ease of explanation, the method 1000 is described as using the function blocks 202-206 and core 208 of FIG. 2 with the data model 300 of FIG. 3 and the CEEB/CEEM tasks of FIGS. 4 through 9. However, the method 1000 could involve the use of any suitable function blocks, data models, and foreground/background tasks. Also, the method 1000 is described as being performed by the controller 106, although any other suitable device could be used.

As shown in FIG. 10, execution of an input function block in a foreground task is initiated at step 1002. This could include, for example, the processing device(s) 142 of the controller 106 initiating execution of the input function block 202 within the CEEB task. Among other things, the input function block collects multiple input values at step 1004. This could include, for example, the input function block 202 reading multiple CV/DV data values, performing any specified pre-processing operations, and storing the pre-processed input values in a memory space 304 of a shared memory 302 (such as in the memory 144 of the controller 106).

Execution of an algorithm function block in a foreground task is initiated at step 1006. This could include, for example, the processing device(s) 142 of the controller 106 initiating execution of the algorithm function block 204 within the CEEB task. Among other things, the algorithm function block receives references to the input values in the shared memory, and the algorithm function block calls one or more functions to be performed in a background task at step 1008. This could include, for example, the algorithm function block 204 calling for execution of the core 208 or for execution of one or more functions of the core 208. When permitted, the functions are executed in the background task at step 1010. This could include, for example, the CEEB task triggering the CEEM task, which executes the core 208. Execution of the algorithm function block is completed at step 1012. This could include, for example, using the results of the background task to complete execution of a control algorithm.

Execution of an output function block in a foreground task is initiated at step 1014. This could include, for example, the processing device(s) 142 of the controller 106 initiating execution of the output function block 206 within the CEEB task. Among other things, the output function block receives references to the data values in the shared memory, and the output function block provides multiple output values at step 1016. This could include, for example, the output function block 206 reading multiple MV data values from the shared memory 302, performing any specified post-processing operations, and outputting the post-processed data values.

Although FIG. 10 illustrates one example of a method 1000 for advanced control in an industrial process control and automation system, various changes may be made to FIG. 10. For example, various steps shown in FIG. 10 could overlap, occur in parallel, occur in a different order, or occur any number of times. As a particular example, the execution of the background task may or may not occur during a particular execution cycle depending on various factors (such as the processing load of the foreground task), so the input function block could be executed multiple times before the execution of the background task completes.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed.

For example, "at least one of: A, B, and C" includes any of the following combinations: A, B, C, A and B, A and C, B and C, and A and B and C.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
executing a first function block configured to (i) receive multiple input data values associated with an industrial process control and automation system, (ii) pre-process the input data values, and (iii) store the pre-processed input data values in a shared memory;
executing a second function block configured to (i) receive references to the pre-processed input data values in the shared memory, (ii) invoke execution of one or more core functions to implement a process control algorithm, and (iii) store output data values in the shared memory; and
executing a third function block configured to (i) receive references to the output data values in the shared memory, (ii) post-process the output data values, and (iii) output multiple output signals containing the post-processed output data values.

2. The method of claim 1, wherein:
the first, second, and third function blocks are executed within a foreground task of a control execution environment; and
the one or more core functions are executed within a background task of the control execution environment.

3. The method of claim 2, wherein:
the control execution environment supports repeating execution cycles;
an amount of execution time for the foreground task varies in the execution cycles; and
an amount of execution time for the background task in each execution cycle depends on the amount of execution time for the foreground task in that execution cycle.

4. The method of claim 2, wherein the background task remains dormant until execution of the background task is triggered by the foreground task.

5. The method of claim 4, wherein the foreground task is configured to identify an execution time for the background task and to halt the execution of the background task if the execution of the background task is not completed when the execution time expires.

6. The method of claim 2, wherein the control execution environment supports multiple semaphores to control access to the shared memory, one semaphore owned by the foreground task, another semaphore owned by the background task.

7. The method of claim 1, wherein:
the first, second, and third function blocks form a component block that is executed by a process controller; and
the process controller is configured to execute multiple component blocks.

8. The method of claim 7, further comprising:
defining a memory space in the shared memory for each of the component blocks.

9. An apparatus comprising:
at least one memory device comprising a shared memory; and
at least one processing device configured to:
during execution of a first function block, (i) receive multiple input data values associated with an industrial process control and automation system, (ii) pre-process the input data values, and (iii) store the pre-processed input data values in the shared memory;
during execution of a second function block, (i) receive references to the pre-processed input data values in the shared memory, (ii) invoke execution of one or more core functions to implement a process control algorithm, and (iii) store output data values in the shared memory; and
during execution of a third function block, (i) receive references to the output data values in the shared memory, (ii) post-process the output data values, and (iii) outputting multiple output signals containing the post-processed output data values.

10. The apparatus of claim 9, wherein:
the at least one processing device is configured to execute the first, second, and third function blocks within a foreground task of a control execution environment; and
the at least one processing device is configured to execute the one or more core functions within a background task of the control execution environment.

11. The apparatus of claim 10, wherein:
the at least one processing device is configured to vary an amount of execution time for the foreground task in each of multiple execution cycles; and
the at least one processing device is configured to set an amount of execution time for the background task in each execution cycle based on the amount of execution time for the foreground task in that execution cycle.

12. The apparatus of claim 10, wherein the background task is configured to remain dormant until execution of the background task is triggered by the foreground task.

13. The apparatus of claim 12, wherein the foreground task is configured to identify an execution time for the background task and to halt the execution of the background task if the execution of the background task is not completed when the execution time expires.

14. The apparatus of claim 10, wherein the control execution environment is configured to support multiple semaphores to control access to the shared memory, one semaphore owned by the foreground task, another semaphore owned by the background task.

15. The apparatus of claim 9, wherein:
the first, second, and third function blocks form a component block; and
the at least one processing device is configured to execute multiple component blocks.

16. The apparatus of claim 15, wherein the at least one processing device is further configured to define a memory space in the shared memory for each component block.

17. A non-transitory computer readable medium embodying at least one computer program, the at least one computer program comprising:
computer readable program code that defines a first function block configured to (i) receive multiple input data values associated with an industrial process control and automation system, (ii) pre-process the input data values, and (iii) store the pre-processed input data values in a shared memory;

computer readable program code that defines a second function block configured to (i) receive references to the pre-processed input data values in the shared memory, (ii) invoke execution of one or more core functions to implement a process control algorithm, and (iii) store output data values in the shared memory; and computer readable program code that defines a third function block configured to (i) receive references to the output data values in the shared memory, (ii) post-process the output data values, and (iii) output multiple output signals containing the post-processed output data values.

18. The non-transitory computer readable medium of claim 17, wherein:

the at least one computer program further comprises computer readable program code that defines a foreground task and a background task of a control execution environment;

the foreground task is configured to execute the first, second, and third function blocks; and the background task is configured to execute the one or more core functions.

19. The non-transitory computer readable medium of claim 18, wherein:

an amount of execution time for the foreground task varies in each of multiple execution cycles; and an amount of execution time for the background task in each execution cycle depends on the amount of execution time for the foreground task in that execution cycle.

20. The non-transitory computer readable medium of claim 18, wherein:

the background task is configured to remain dormant until execution of the background task is triggered by the foreground task;

the foreground task is configured to identify an execution time for the background task and to halt the execution of the background task if the execution of the background task is not completed when the execution time expires; and the control execution environment is configured to support multiple semaphores to control access to the shared memory, one semaphore owned by the foreground task, another semaphore owned by the background task.

\* \* \* \* \*